July 4, 1944.　　　　E. M. GREEN　　　　2,353,030

THREADED FASTENER

Filed Feb. 9, 1943

INVENTOR.
BY EMMET M. GREEN
Kwis Hudson & Kent
ATTORNEYS

Patented July 4, 1944

2,353,030

UNITED STATES PATENT OFFICE 2,353,030

THREADED FASTENER

Emmet M. Green, Los Angeles, Calif.

Application February 9, 1943, Serial No. 475,267

7 Claims. (Cl. 85—46)

This invention relates to threaded fasteners and more particularly to an improvement in threaded fasteners of the kind having the characteristics of both a screw and a rivet.

An object of the invention is to provide an improved fastener of this kind having a strong and rugged thread of novel form enabling the fastener to be used satisfactorily for both light and heavy duty.

A further object of the invention is to provide a fastener of the character mentioned in which the thread has a blunt or rounded upper end spaced from the head to form a backout-arresting shoulder for effectively preventing reentry of the thread in the work opening when the fastener has been fully driven, and in which the thread increases in width toward said blunt end so as to strengthen the thread and facilitate its passage through the work.

Other objects and advantages of the invention will be apparent from the following description when taken in conjunction with the acompanying sheet of drawings in which Fig. 1 is an elevation of my improved fastener showing the same on an enlarged scale;

Before proceeding with a more detailed description of my improved fastener, it is well to point out in a general way that my fastener can be used for a variety of different purposes and particularly where two or more plates or other parts are to be permanently connected or fastened together. It is especially useful for attaching or fastening purposes where one side of the work is inaccessible to wrenches or riveting tools. As will be explained more in detail herein, my fastener is adapted to be screwed into the work and embodies a backout-arresting means which effectively prevents removal of the fastener from the opening of the work when the fastener has been fully driven.

Figure 1:
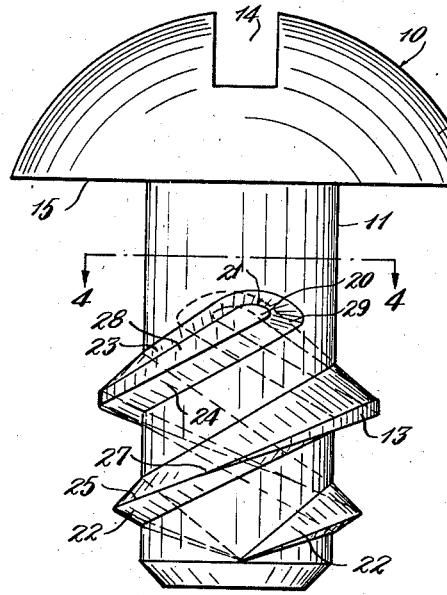
Figure 4:
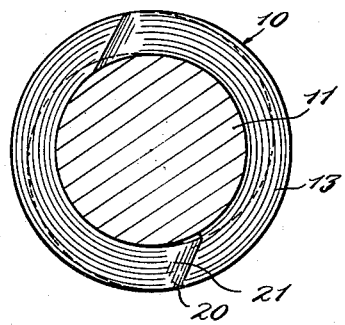
Fig. 4 is a transverse sectional view taken through the fastener as indicated by line 4—4 of Fig. 1.
Figure 5:
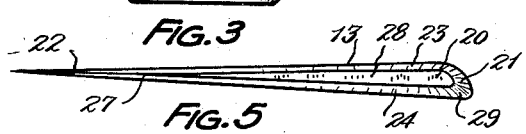
Fig. 5 is a developed plan view of the thread of the fastener.

As shown in Figs. 1 and 4, my improved fastener 10 comprises a stem 11 provided at its upper end with a head 12 and carrying one or more helical threads 13, in this instance two such threads spaced 180° apart and each of which extends through approximately 360° or slightly more than 360°. The head may be of any desired shape or form, and in this instance is shown as being a round head having the usual screwdriver slot 14 therein and having a substantially flat undersurface 15 forming a work engaging face or shoulder.

Figure 2:
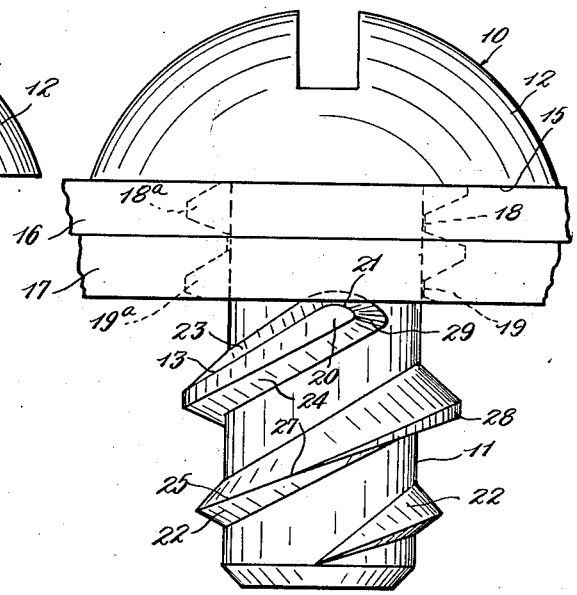
Fig. 2 is an elevation showing a completed assembly or fastening utilizing my improved fastener.
Figure 3:
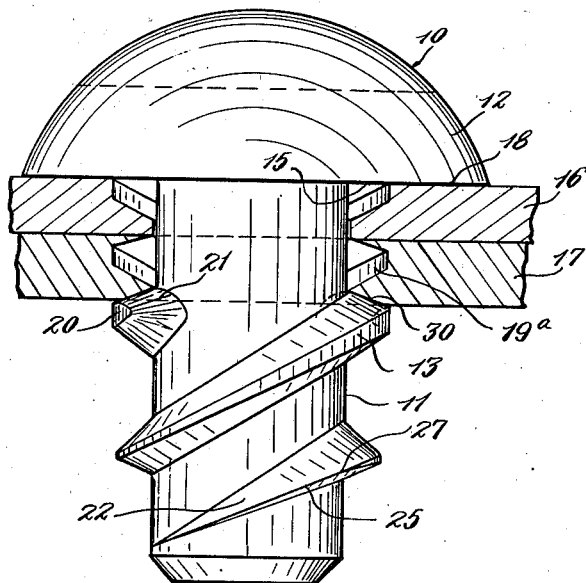
Fig. 3 is a view similar to Fig. 2 but with the fastener rotated through 90° and with the work pieces shown in section.

In Figs. 2 and 3 I show my fastener 10 applied to a pair of plates or elements 16 and 17 which are to be permanently connected. The outer work piece 16 has a preformed opening 18 therein and the inner work piece 17 has a preformed opening 19 substantially aligned with the opening 18. These openings are preferably of a size only a little larger than the diameter of the stem 11. When the fastener is applied to the work piece it is rotatively advanced through the preformed openings by causing the threads 13 to cut or indent thread grooves 18a and 19a in the walls of the openings 18 and 19 during their passage through the work.

As shown in the drawing, the upper ends 20 of the threads 13 are spaced from the head 12 and are provided with enlargements forming backout-arresting shoulders 21 which engage the inner surface of the work piece 17 when the fastener has been fully driven and which cooperate with the surface 15 of the head for clamping the work pieces together in permanently connected or riveted relation. The upper thread ends 20 are of blunt or rounded form so that reengagement of the threads in the opening of the work will not take place even though an attempt is made to unscrew the fastener from the work. The axial distance which the shoulders 21 are spaced from the head 12 is usually dependent upon the thickness of the work and is preferably such that when the surface 15 of the head is in engagement with the outer surface of the plate or element 16 the shoulders will be in the above described clamping engagement with the inner plate or element 17.

In accordance with the present invention, the threads 13 are so formed that they increase in width from their relatively sharp lower ends 22 toward the head 12 and are of maximum width at their blunt or rounded upper ends 20. The upper and lower helically extending faces 23 and 24 of the threads are sloping or beveled faces and at the lower ends of the threads these faces meet or converge to give the initial section of the threads a V-shape with a relatively sharp top edge which affords easy starting of the fastener in the opening of the work piece 17. The height of the threads increases progressively for the length of this relatively sharp initial or starting section until the full thread height is reached at the point 27. From the point 27 to the upper end 20 the thread height remains substantially constant but the thread width increases progressively and the width of the flat tops 28 of the threads increases correspondingly from the points 27 to a maximum width at the blunt upper ends 20. As shown in the drawing, the beveled upper faces 23 of the thread convolutions are carried across and around the upper thread ends 20 so as to impart to these thread ends both a convexly rounded and a beveled form, and with such beveled upper faces ultimately merging smoothly into the beveled lower faces 24 at or adjacent the point 29. The rounded shoulders 21 thus formed at the upper ends of the threads effectively prevent reengagement of the threads in the work opening.

During the passage of the threads through the work they cause some of the metal to be displaced or swaged therefrom (not shown) and after the threads have passed completely through the inner work piece, the rounded shoulders 21 on the upper ends of the threads exert a camming or wiping action on such displaced metal and press or swage the same back into the work substantially to a position preventing reentry of the threads in the work opening. Usually the thickness of the work in comparison with the spacing of the thread ends from the head 12 will be such that the rounded and beveled shoulders 21 will indent themselves more or less into the inner surface of the work piece 17 as indicated at 30 in Fig. 3, and even when such indentation occurs, I find that these shoulders effectively prevent reengagement of the threads in the work opening.

The threads 13 may be formed on the stem 11 of the fastener in any appropriate manner, such as by suitable thread-rolling dies. The fastener 10 or at least the threads thereof are suitably hardened to enable the threads to indent or cut their way into the work while the fastener is being driven.

From the foregoing description and accompanying drawing it will now be readily seen that I have provided a fastener having characteristics of both a screw and a rivet and in which the thread is strong and rugged enabling the fastener to be satisfactorily used for both light and heavy duty. It will be seen moreover that the thread being of increasing width its passage through the work is facilitated and its rounded and beveled upper end provides a backout-arresting shoulder of a form which effectively prevents withdrawal of the fastener from the work by reverse rotation.

While I have illustrated and described my improved fastener in considerable detail, it will be understood, of course, that I do not wish to be correspondingly limited but regard my invention as including such changes and modifications as do not constitute a departure from the spirit of the invention and the scope of the appended claims.

Having thus described my invention, I claim:

1. A fastener of the character described comprising a screw having a head and a threaded stem and adapted to be advanced in a work opening by rotation therein, the portion of the thread nearest the tip of the screw being a relatively sharp V-thread and the portion of the thread above the V-thread portion having a flat top and being of increasing width toward the head with a maximum width at its upper end, said upper end being rounded and beveled and being spaced from said head.

2. A fastener of the character described comprising a screw whose thread is relatively sharp at one end and blunt at the other end and increases progressively in width from the sharp end to the blunt end, said thread extending through approximately 360°.

3. A fastener of the character described adapted to be advanced and permanently secured in a work opening by rotation therein, comprising a headed stem having a hardened helical thread of approximately 360° in extent and whose upper end is spaced from the head substantially in accordance with the work thickness and is provided with an enlargement having beveled and rounded side faces and adapted to prevent reengagement of the thread in the work opening, the lower end of said thread being a V-thread with a relatively sharp top and the portion above said V-thread having a flat top and increasing in width to a maximum thickness at said enlargement.

4. A fastener of the character described adapted to be advanced and permanently secured in a work opening by rotation therein, comprising a headed stem having a hardened helical thread whose upper end is spaced from the head substantially in accordance with the work thickness, said thread increasing progressively in thickness toward its upper end and said upper end of the thread having side faces shaped to form a rounded and beveled shoulder engageable with the underside of the work and adapted to prevent reentry of the thread in the work opening.

5. A fastener of the character described adapted to be advanced and permanently secured in a work opening by rotation therein, comprising a headed stem having a hardened helical thread whose upper end is spaced from the head substantially in accordance with the work thickness, said thread increasing in width toward the head to a maximum thickness at its upper end and said upper end being beveled and rounded to prevent reengagement of the thread in the work opening.

6. A fastener of the character described adapted to be permanently secured in a work opening, comprising a headed stem having a hardened helical thread whose upper end is spaced from the head substantially in accordance with the work thickness, said thread increasing in width toward the head to a maximum thickness at its upper end and having oppositely beveled upper and lower side faces, said upper side face being carried across and around the upper end of the thread and imparting thereto a rounded and beveled shape adapted to prevent reentry of the thread in the work opening.

7. A fastener of the character described adapted to be permanently secured in a work opening, comprising a headed stem having a hardened helical thread whose upper end is spaced from the head substantially in accordance with the work thickness, said thread increasing in width from its lower end toward the head to a maximum thickness at its upper end and having oppositely beveled upper and lower side faces which converge to a relatively sharp V-shape at said lower end, said upper side face being carried across and around the upper end of the thread and imparting thereto a rounded and beveled shape adapted to prevent reentry of the thread in the work opening.

EMMET M. GREEN.